United States Patent [19]

Napierski

[11] Patent Number: 5,492,154
[45] Date of Patent: Feb. 20, 1996

[54] METHOD AND APPARATUS FOR PRODUCING A WAVE WINDING

[76] Inventor: Reinhard Napierski, Talstrasse 16, 61197 Niddatal, Germany

[21] Appl. No.: 181,554

[22] Filed: Jan. 14, 1994

[30] Foreign Application Priority Data

Jan. 14, 1993 [DE] Germany ............ 43 00 764.3

[51] Int. Cl.⁶ ........................ B21F 3/00
[52] U.S. Cl. ........................ 140/92.1
[58] Field of Search ............ 140/92.1, 92.2

[56] References Cited

U.S. PATENT DOCUMENTS 3,791,419  2/1974  Arick et al. ............ 140/92.1
3,866,847  2/1975  Droll ..................... 140/92.2
3,872,897  3/1975  Droll et al. ............ 140/92.1

FOREIGN PATENT DOCUMENTS 2351592  5/1975  Germany.
3343390  10/1986  Germany.

*Primary Examiner*—Lowell A. Larson
*Attorney, Agent, or Firm*—Robert J. Koch

[57] ABSTRACT

The method and apparatus are used to produce a wave winding. To simplify and accelerate the production of wave windings, after winding at least one turn, a stripping stroke pushes the wire between and axially along the first and second shaping elements, which causes radial deformation of the wire to take place in each continual stripping sub-stroke.

17 Claims, 4 Drawing Sheets

METHOD AND APPARATUS FOR PRODUCING A WAVE WINDING

BACKGROUND OF THE INVENTION

1. Field of the Invention

The invention relates to a method and apparatus for producing a wave winding for stators of electrical machinery. More particularly, this invention is for a method and apparatus for producing a wave winding where a winding wire is wound onto shaping elements arranged in a circle and acquires a wave shape between the shaping elements.

2. Discussion of Related Technology

In the manufacture of stators, it is common practice to prefabricate coils on a template, strip them in a puller and then pull them axially into the stator slots. Producing and transferring a wave winding directly over the pulling tool or transfer tool causes difficulties.

A process and apparatus for winding and placing a wave winding in the slots of stators are described in DE-PS 33 43 390. There, a first complete coil is wound onto a set of first shaping elements arranged in a circle, and subsequently a set of second shaping elements is moved from the outside against the coil and deforms it. In the same pass with the radial stroke of the second shaping elements, the first shaping elements must yield until a wave winding is shaped. Other publications are also known which have similar designs. All these devices have one thing in common: they first wind a roughly round coil with several turns and then deform them, i.e., all turns together, into a wave winding. This method is very expensive and susceptible to problems, since the device consists of a host of movable parts. To obtain uniform quality of a wave winding, the first shaping elements must be moved synchronously with the second shaping elements during forming, or they must be equipped with expensive damping tubes.

A device for winding and placing coils in the slots of stators of electrical machinery is also described in DE-AS 23 51 952. There, a winding wire is wound circularly from a delivery tube onto first and second shaping elements arranged in a star shape to form a winding. Below the star-shaped arrangement of the first and second shaping elements is a coil pulling device. The first shaping elements consist of a section which bears the winding and a drawing section located above it at a distance. The second shaping elements are made essentially cylindrical and are bent downwards towards the coil pulling device. The second shaping elements project in part into the interior of the circle which is formed by the fingers of the coil pulling device which are located at an interval adjacent to one another. After a preliminary winding has been formed or placed on the first and second shaping elements, the first shaping elements, located between the second shaping elements each move downward, which causes the drawing section to move downwards and fit internally into the winding and draw it downward. While moving downwards, the winding slides over the second shaping elements, which are bent downwards into the intermediate spaces between the fingers of the coil pulling device.

It is a disadvantage in this example that half of the shaping elements move during the forming process and the turns are not shaped in an ordered manner, but rather are wound as a ring-shaped tangle, as the turns move with the first shaping elements and are drawn over the second shaping elements. In doing so, the individual turns are reproduced in an uncontrolled manner and can reach between the fingers of the coil pulling device only with strong tension of the first shaping element. A certain ordering or sequencing of the turns is necessary in order for the turns to reliably reach between the fingers of a coil pulling device.

SUMMARY OF THE INVENTION

An object of the invention is to devise a process and a device suitable for implementing a simplified wave winding fabrication and wave windings which may be transferred with better geometrical accuracy.

The invention proposes to solve this problem by a stripping stroke pushing a turn between and axially along a first and second shaping element after winding at least one turn, whereby radial deformation of the turn is intensified and wave formation takes place for each continual partial stripping stroke.

The invention offers the advantage that each individual turn of a wave winding is always kept guided on the path from the winding plane to the pulling device in a controlled manner and thus ensures a uniform, accurate transfer between the shaping elements and disks of the pulling tool. Turns can be shaped very simply, very quickly and reliably in the preferred embodiment of the present invention by a stripper which, after at least one turn is wound, pushes the turn between and axially along the first and second shaping element. Safety in the forming process is achieved by the fact that the two shaping elements are stationary during stripping and are adjusted such that the turns of a certain peripheral diameter in each axial stripping subposition are held radially and axially. Two shaping elements radially hold the winding. The winding is axially held by the stripper and the deformation friction.

Another advantage of this method is that after completion of the winding process and stripping process, a wave winding is already formed. Then the winding simply needs to be stripped into a pulling tool. A stripping stroke can take place in one pass from the winding plane into the pulling tool or transfer tongs.

The same circumference, with an increasing radial deflection, is preferred from the winding plane to the pulling tool between and axially along the two shaping elements on each new radial plane so that a wave turn is formed from an almost circular turn on the winding plane in the pulling tool. In each continual stripping substroke, the turn assumes a new radial position and the circumference of the turn is preserved.

Aside from the deformation stroke of the turn, different winding principles can be used. Another embodiment of this winding method utilizes continuous winding and stripping. In this case, the turns reach between the shaping elements during winding. By winding onto the first shaping elements, the wound turn is stripped directly between the shaping elements and comes to rest outside the first and within the second shaping elements. When all turns are wound, a completion stroke takes place and deforms the remaining turns.

In another embodiment, one layer of turns is wound onto the first shaping elements, and then, after the two shaping elements have moved into one another, a stripping stroke is applied which is simultaneously the shaping stroke. At the narrowest point between the two shaping elements, there is a minimum distance of one turn wire diameter so that a turn can be easily stripped between the shaping elements. A maximum distance is determined by the slot width between the pulling disks. In the area of the puller it may not be larger than its slots. In the region which dips into the pulling tool the two shaping elements are designed such that they have a final wave shape. In this case, one turn is between the cams and fingers of the shaping elements and forms a wave winding.

The stripper is the sole moving part of the device in deformation of the turn and can be configured in various ways. The stripping blades which extend in the cams and in the fingers from the largest diameter at the time to the smallest are advantageous. These stripping blades can be molded onto guide rods or a stripper plate. A preferred embodiment contains a stripper plate which fits between the shaping elements and has stripper blades which extend radially inward in the cams and radially outward into the fingers.

DETAILED DESCRIPTION OF THE PREFERRED EMBODIMENT

Figure 1:
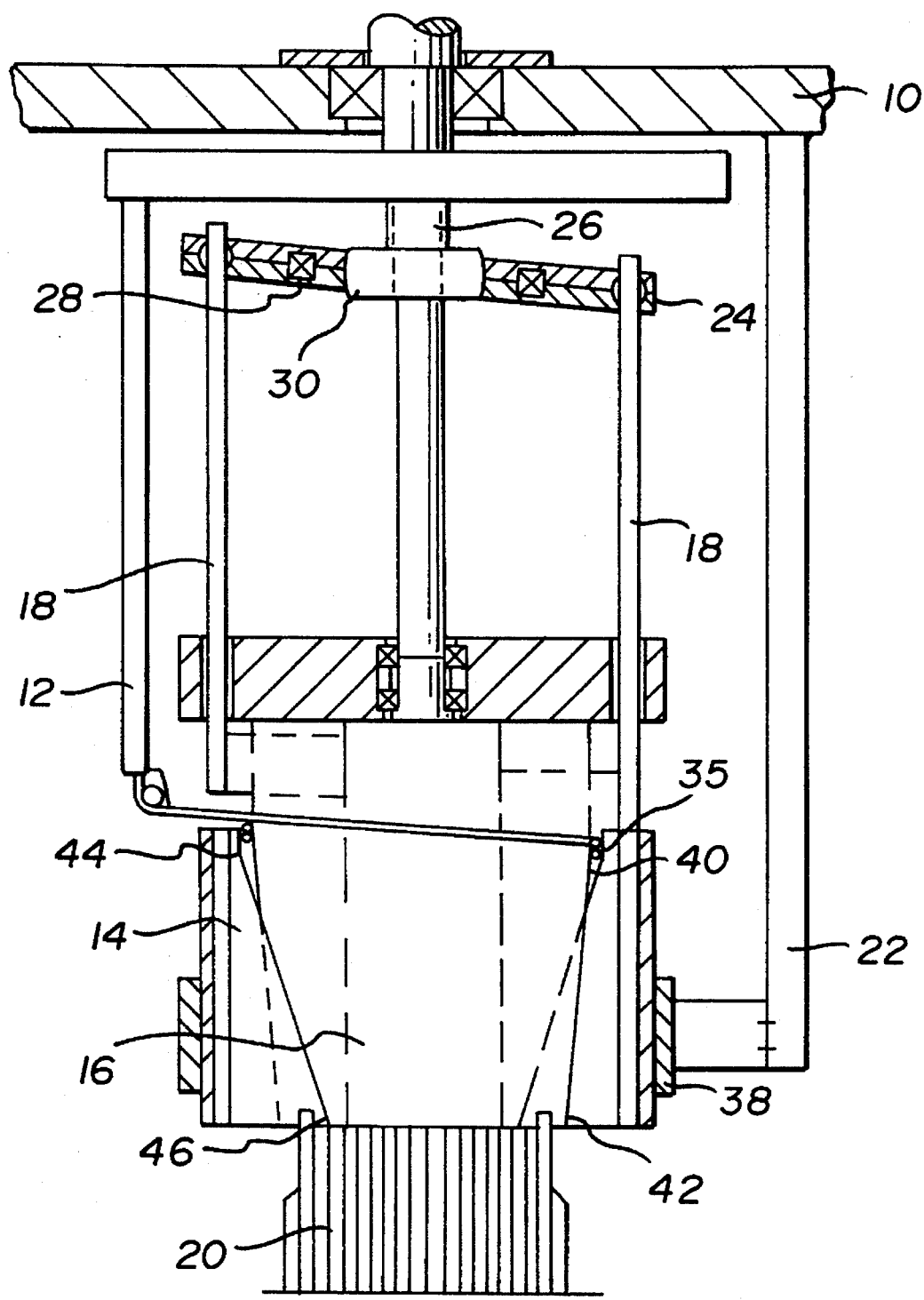
FIG. 1 shows a wave winding device with vertical first shaping elements.

The winding device shown in FIG. 1 has a machine housing 10 on which the parts described below are mounted or screwed. The winding tools include a rotatable winding nozzle 12, several first shaping elements 14 which are kept torsionally strong during the winding process with stripper 18, and coil receiver 20. Second shaping elements 16 are screwed to machine housing 10 via a crosshead 22. Receiver 20 can be transfer tongs or a pulling tool and is conveyed automatically or manually to the winding station. After receiver 20 is positioned in the winding station, it moves axially into shaping elements 14 and 16. First shaping elements 14 and a wobble plate 24 in which strippers 18 are supported are prevented from twisting by an ordinary retaining gear which is not shown here. Wobble plate 24 is flanged to a rotary shaft 26 which turns synchronously with winding nozzle 12; however, separated by bearing 28 to prevent entrainment, wobble plate 24 in its wobble motion or the stroke of stripper 18 can be adjusted via domed bearing 30.

Figure 2:
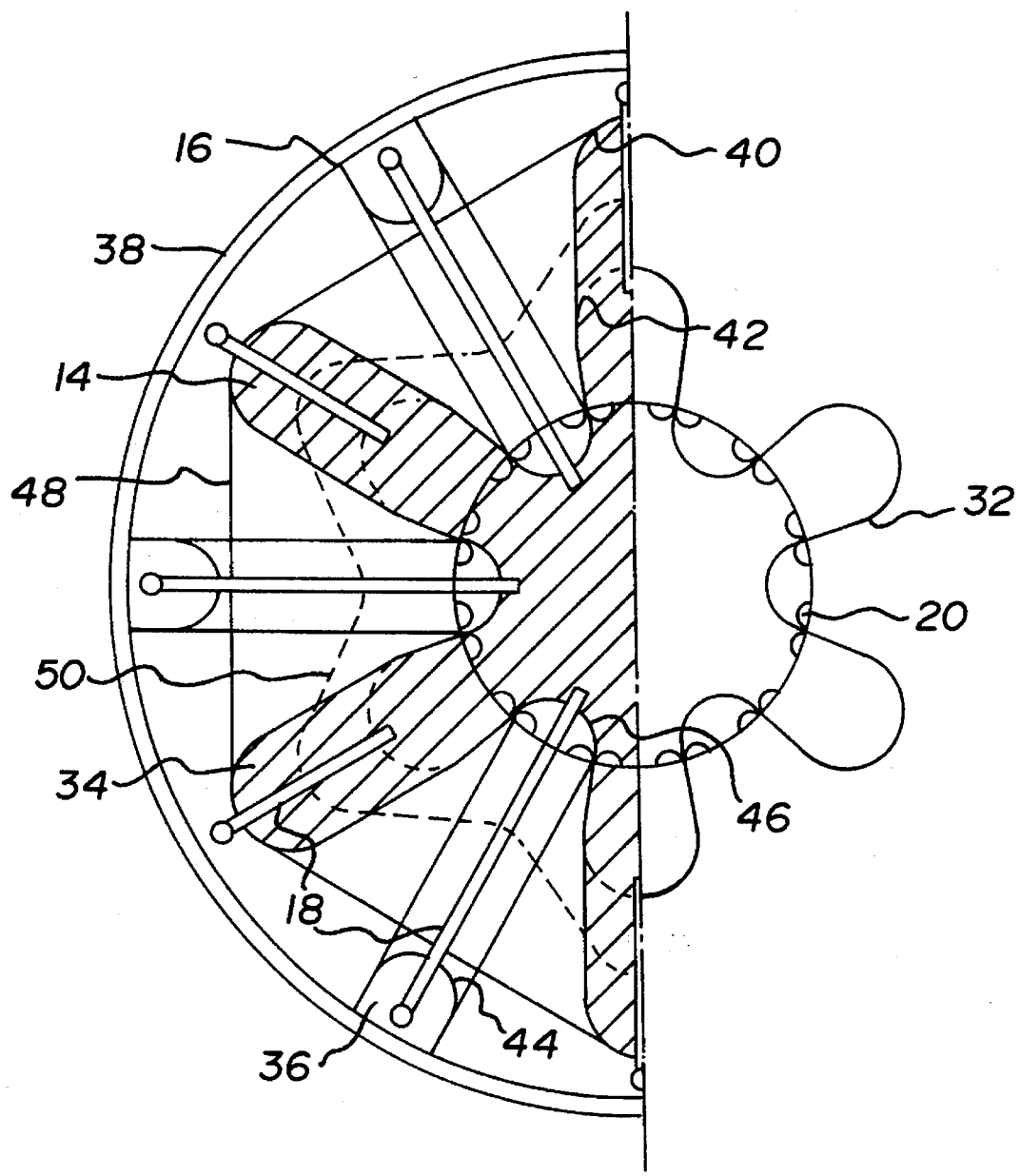
FIG. 2 shows a top view of a receiver with shaping elements as shown in FIG. 1.

FIG. 2 is a top view, cross sectioned above the stripper blades, of receiver 20, in which the left side of FIG. 2 shows shaping elements 14 and 16 with strippers 18, and the right side shows an already wound and deformed wave winding 32 in receiver 20. First shaping elements 14 are manufactured in one piece and in the example have 6 cams 34 on the periphery which taper in their outside diameter from winding plane 35 to receiver 20. Second shaping elements 16 accordingly also have six fingers 36 which likewise taper from winding plane 35 to receiver 20, however in their inside diameter. Individual fingers 36 are screwed permanently onto a ring 38 or are manufactured in one piece. Fingers 36 are arranged in a circle such that they fit between cams 34 of first shaping fingers 14; there must be a distance of at least one wire diameter between them. In order to keep fingers 36 in the described position, ring 38 is screwed to crosshead 22. Strippers 18 extend radially into cam 34 of first shaping elements 14 from largest outside diameter 40 to smallest outside diameter 42, thus only outside receiver 20, and for fingers 36 of second shaping elements 16 from largest inside diameter 44 to smallest inside diameter 46, in this case from outside receiver 20 into its interior. A different arrangement of strippers 18 is possible, but would not guarantee an optimum stripping process.

During winding, winding nozzle 12 rotates around first shaping elements 14 and places wire 48 in the form of a turn in the area of winding plane 35 on cams 34. This winding process produces a wave winding where winding wire 48 is wound onto shaping elements 14, 16 arranged in a circle and acquires a wave shape between the shaping elements 14, 16. During winding, the turns are continuously stripped by strippers 18 along first shaping elements 14. The stripping stroke, driven by wobble plate 24, is somewhat greater than the diameter of the wire to be wound, so that the winding plane is always free for the next turn. Second shaping elements 16 with their largest inside diameter of 44 are located just under winding plane 35 so that during continuous winding and stripping the stripped turns are kept directly grasped or guided by fingers 36. The stripping is accomplished during the winding after at least one turn of the wire 48 has been made. The turn of wire 48 is pushed or stripped between and axially along the first and second shaping elements 14, 16. Wire 48 is radially deformed during each continual stripping substroke by stripper 18 during the winding process until the entire wave winding is wound. Thereafter, a stripping and forming stroke of stripper 18 occurs. The same circumference, with an increasing radial deflection, is preferred from the winding plane 35 to the pulling tool receiver 20 between and axially along the two shaping elements 14, 16 on each new radial plane so that a wave turn is formed from an almost circular turn on the winding plane 35 in the receiver 20 pulling tool. In each continual stripping substroke, the turn of wire 48 assumes a new radial position and the circumference of the turn is preserved on each radial plane.

During subsequent winding, one turn after another is wound and stripped. The stripped turns are held from the inside by cams 34 and from the outside by fingers 36, and are further conveyed axially to receiver 20 by the turns which have been freshly stripped each time. One intermediate position of wire 48 is shown in FIG. 2, i.e. broken line wire 50. The end position is when wire 48 has reached receiver 20 and a wave winding 32 has been formed. When the desired number of turns has been reached a final stroke, or push, of strippers 18 takes place, in which strippers 18 move along first and second shaping elements 14, 16 axially from winding plane 35 to receiver 20. On this path the remaining turns are stripped, for which radial deformation of the turn which intensifies in wave formation takes place for each continuing axial stripping position. When the number of turns is small, it is also possible to wind one layer of turns only onto first shaping elements 14 and then strip all of them with a stripping stroke and in doing so, deform them.

Figure 3:
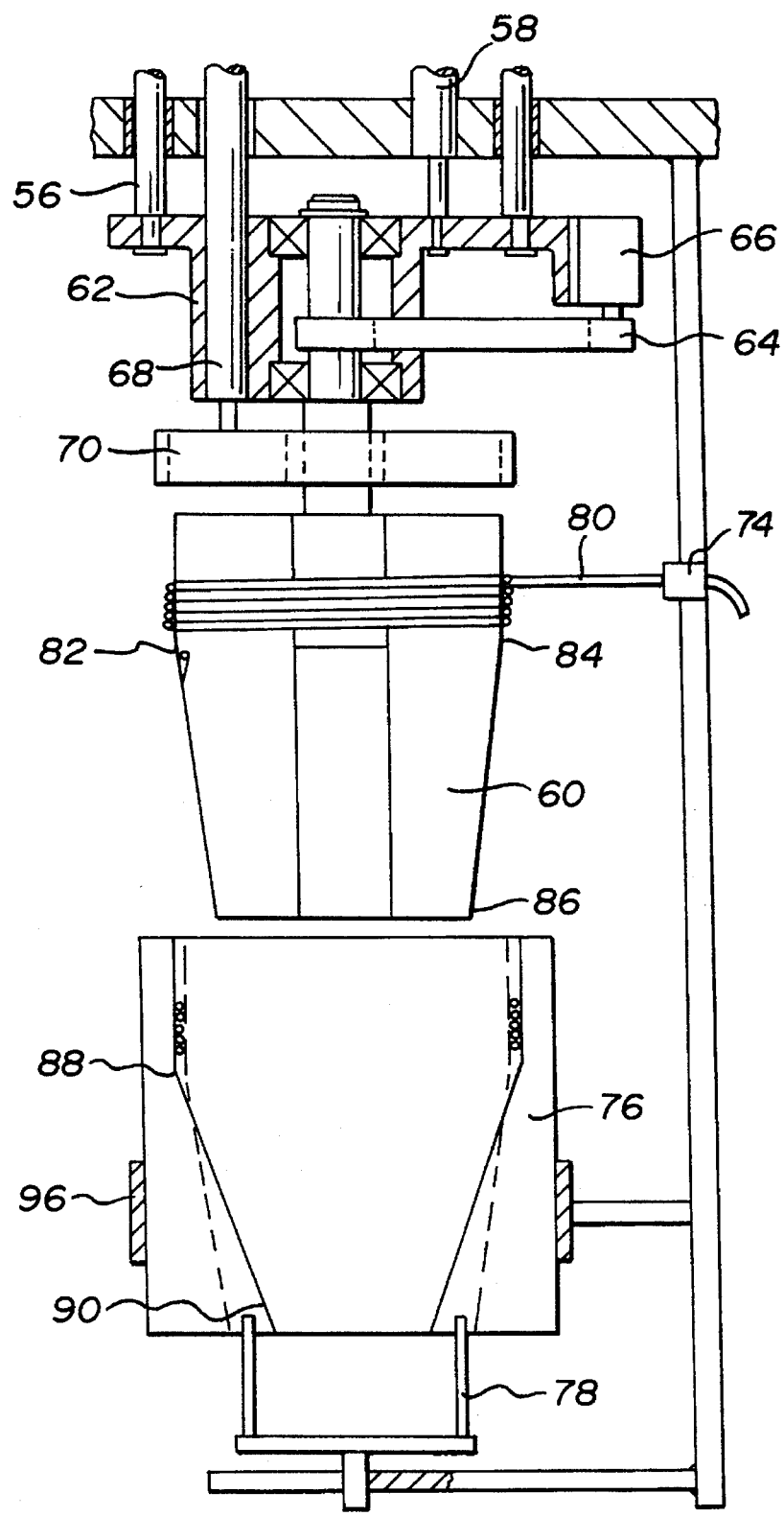
FIG. 3 shows a wave winding device with rotating first shaping elements.

The winding device shown in FIG. 3 differs from the one shown in FIG. 1 in its application only by the fact that in FIG. 1 a winding nozzle rotates around stationary shaping elements and in FIG. 3 rotating shaping elements withdraw the winding wire from a relatively fixed traversing unit. FIG. 3 shows a side view of a winding device with a machine housing 54 in which a crosshead 56 is supported and a lifting cylinder 58 is clamped. First shaping elements 60 are pivotally mounted in a carrier 62 and can be driven via a belt drive 64 and a motor 66. The carrier 62 is kept guided by means of crosshead 56 and can be moved axially by lifting cylinder 58. A lifting cylinder 68 is securely clamped on carrier 62; the cylinder can move a stripper plate 70 axially. A traversing unit 74 which can be moved axially along first shaping elements 60, second shaping elements 76 and a coil receiver 78 are mounted on a brace 72 which is a part of machine housing 54. The axes of the three parts: first shaping elements 60, second shaping elements 76, and coil receiver 78, are flush with one another. Before winding a coil, the start of one wire 80 is inserted into a catch projection 82, so that when first shaping elements 60 turn, wire 80 is drawn from traversing unit 74. The contours of shaping elements 60, 76 extend axially in first shaping element 60 from a large outside diameter 84 which is simultaneously the winding plane to a small outside diameter 86, and in second shaping element 76 from a large inside diameter 88 to a small inside diameter 90.

Figure 4:
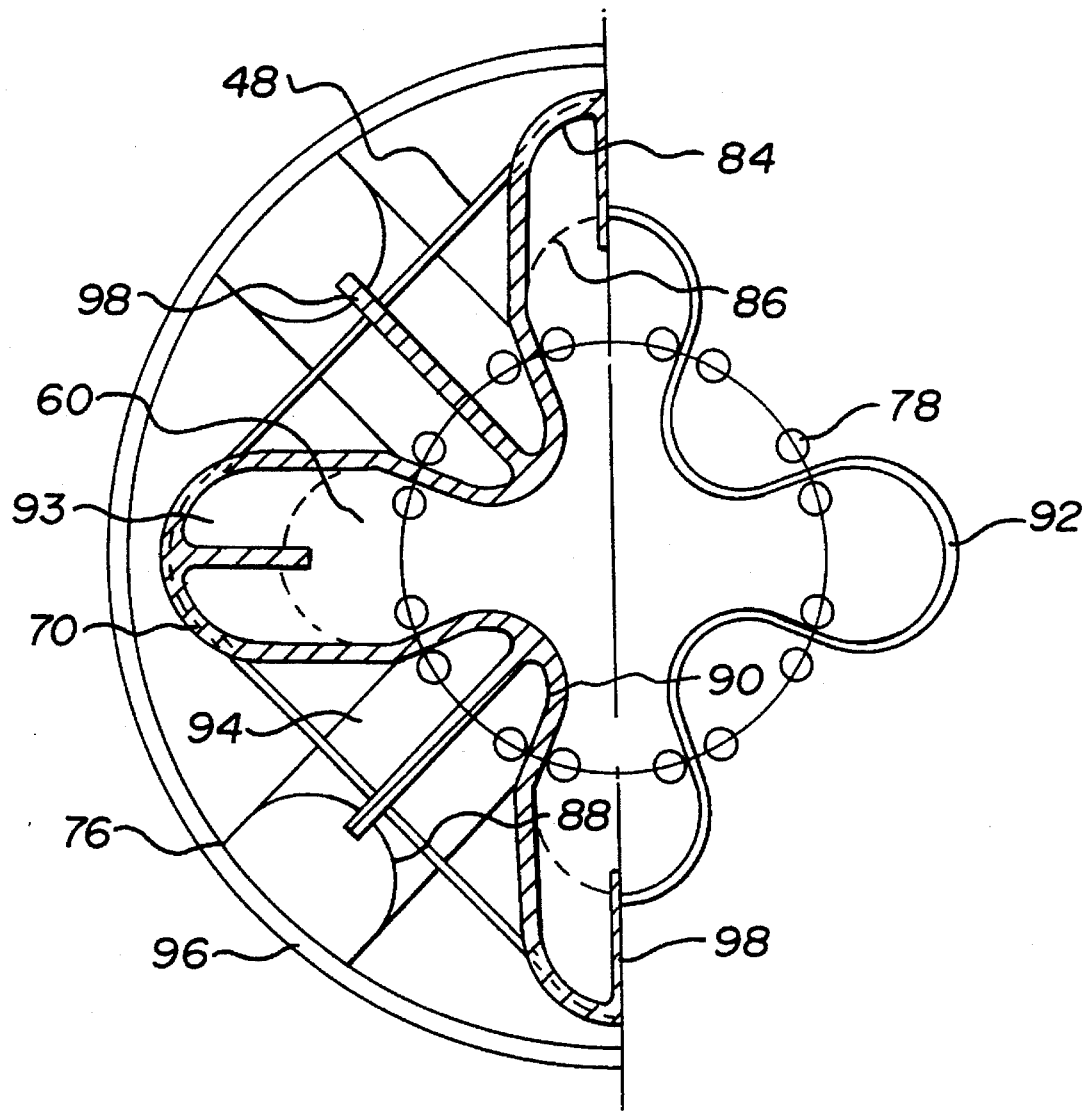
FIG. 4 shows a top view of a receiver with shaping elements as shown in FIG. 3.

FIG. 4 shows a top view, cross sectioned through stripper plate 70, of the device as per FIG. 3, in which the left side shows shaping elements 60 and 76 with stripper plate 70, and the right side shows an already wound and deformed wave winding 92 in coil receiver 78. First shaping elements 60 in this sample case have four cams 93 which extend from a large outside diameter 84 to a small outside diameter 86. Second shaping elements 76 accordingly also have four fingers 94 which taper likewise from a large inside diameter 88 to a small inside diameter 90. Individual fingers 94 are connected to a ring 96 and are arranged such that they fit between cams 93 of first shaping elements 60 so that there must be a distance between them of at least one wire diameter. To keep fingers 94 in this position, ring 96 is screwed to brace 72. Stripper plate 70 surrounds the first shaping elements 60 with corresponding play and extends with a stripper blade 98 into cams 93 and into fingers 94 of second shaping elements 76. A turn 48 shown in FIG. 4 lies between cams 93 and fingers 94 and becomes a wave winding 92 following the stripping stroke.

The device according to FIGS. 3 and 4 begins to operate when the start of the winding wire is inserted into catch projection 82 of first shaping elements 60. Then first shaping elements 60 are caused to rotate via belt drive 64 and by motor 66, and in this way winding wire 80 is inevitably drawn from traversing unit 74. In order that the winding wire is taken up in succession, traversing unit 74 moves axially along first shaping elements 60 according to the wire diameter. At this point the winding wire is cut and held with a clamping and cutting blade which is not shown. Following the winding process, the deformation process can take place. To do this carrier 62, driven by lifting cylinder 58, is moved axially, and in doing so entrains first shaping elements 60 and stripper plate 70. First shaping elements 60 dip into second shaping elements 76 and remain in a bottom position, shown in FIG. 3 by the broken line. In this position, coil receiver 78 located axially opposite moves into two shaping elements 60, 76 and with them forms a unit. In this position, the taken-up turns are kept grasped and guided also by second shaping elements 76. The clamping and cutting blade which is not shown also moves synchronously with dipping of first shaping elements 60, and in this position it can relieve the tension on the winding, on the one hand because the turns are already kept guided, and on the other hand the turns can be better stripped in a relatively loose state. This is followed by a stripping stroke which is simultaneously a deformation stroke of the winding wire. Stripper plate 70 is pushed axially by lifting cylinder 68 between shaping elements 60, 76 in which the windings are pushed between and axially along the first and second shaping elements 60, 76 by this and at the same time are deformed into a wave winding. This stripping stroke also strips the start of the wire from catch projection 82. On the deformation path which extends between winding plane 84 and coil receiver 78, each turn is lined up in succession, especially for thick winding wire, and stripper plate 70 transfers the stripper force only to the winding wire wound last or the first winding wire in front of stripper plate 70. The stripper force acts on and via the individual turns in front and pushes them into the coil receiver. After the coil receiver has accepted shaped wave winding 92, it moves away from shaping elements 60, 76 and can be removed by hand or swivelled out of this area by means of a rotary table.

The two devices shown have the advantage that shaping elements 14, 16 and (60, 76 have a fixed contour and parts which cannot be moved radially. The deformation forces are absorbed by fixed cams 34, 93 and fingers 36, 94. Another special feature of the invention is that the winding wire is kept always controlled from winding plane 35, 82 through the deformation section to coil receiver 20, 78. As the windings shown in FIG. 3 are arranged on first shaping elements 60 in succession, they remain on the entire section as far as the coil receiver. The individual diameters of cams 34, 93 and fingers 36, 94 of the two shaping elements are matched to one another such that the turns of a certain peripheral diameter are held axially and radially during forming in each axial stripping subposition. The turns are held radially by the two shaping elements and are held axially by the stripper on one hand and on the other hand by the deformation friction which does not allow the turns to fall down by themselves axially into the coil receiver. This guarantees that the turns are also stripped without difficulty into the slots of the coil receiver provided for this purpose. It is also possible, especially for thin wires, to wind and form several layers so that several turns are deformed as they lie radially next to one another. In this case, however, it must be guaranteed that the two shaping elements, especially in the area of the coil receiver, are matched such that only the width of one number of turns is stripped which can also reach between the slots of the coil receiver.

The foregoing disclosure and description of the invention are illustrative and explanatory of the preferred embodiments, and changes in the size, shape, materials and individual components, elements, connections and construction may be made without departing from the spirit of the invention.

What is claimed is:

1. A method for producing wave windings for stators of electrical machinery, comprising the steps of:

winding a wire on first shaping elements arranged in a circle; shaping said wire into a wave shape between said first shaping elements and second shaping elements; pushing said wire with a stripping stroke during said step of winding after winding said wire at least one turn which pushes said wire between and axially along said first and second shaping elements; and radially deforming said wire during each stripping stroke during said step of winding.

2. The method according to claim 1, wherein said wire is axially and radially guided during each stripping stroke.

3. The method according to claim 1, wherein the circumference of said turn is the same on each radial plane between and axially along said first and second shaping elements.

4. The method according to claim 1, wherein said wire assumes a new radial position during each stripping stroke.

5. The method according to claim 1, wherein during said step of winding a wave winding a short stripping stroke step takes place until the entire said wave winding is wound.

6. The method according to claim 1, wherein after said step of winding, a stripping and forming stroke takes place.

7. An apparatus for producing wave windings for stators of electrical machinery, comprising:

a machine housing; a winding nozzle mounted to said housing; first and second shaping elements mounted to said housing; a stripper mounted to said housing; and a coil receiver mounted to said housing; wherein said stripper pushes a wave winding between and axially along said first and second shaping elements after said wave winding has been wound at least one turn, and whereby radial deformation of the wave winding takes place while said stripper operates.

8. The apparatus according to claim 7, wherein after a wave winding is wound on said first shaping elements, said wave winding is stripped axially by said stripper between said first and second shaping elements.

9. The apparatus according to claim 7, wherein said first shaping elements are axially displaceable.

10. The apparatus according to claim 7, wherein said first shaping elements and the second shaping elements remain stationary during radial deformation of said wave winding.

11. The apparatus according to claim 10, wherein at least one diameter of a wave winding exists between said first and second shaping elements.

12. The apparatus according to claim 10, wherein a final shape of said wave winding is formed in an area between said first and second shaping elements.

13. The apparatus according to claim 7, wherein said first shaping elements are comprised of cams which taper from said coil receiver to a winding plane and said second shaping elements are comprised of fingers which taper from said winding plane to said coil receiver, whereby one of said fingers is disposed between adjacent cams.

14. The apparatus according to claim 13, wherein the circumference of said wave winding is the same on each radial plane axially along said first and second shaping elements and between said cams and fingers.

15. The apparatus according to claim 13, wherein said fingers are disposed along a ring mounted to said housing.

16. The apparatus according to claim 7, wherein a stripper plate is disposed between said first and second shaping elements and can be moved axially.

17. The apparatus according to claim 13, wherein stripper blades extend into said cams and into said fingers.

* * * * *